July 6, 1948.  L. R. STAHNKE ET AL  2,444,791
FISHING LINE FLOAT
Filed April 19, 1946
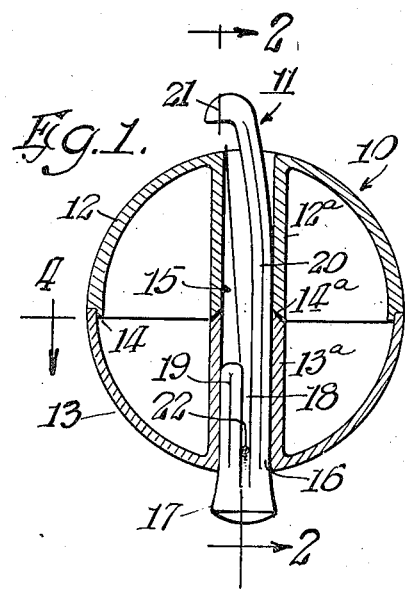
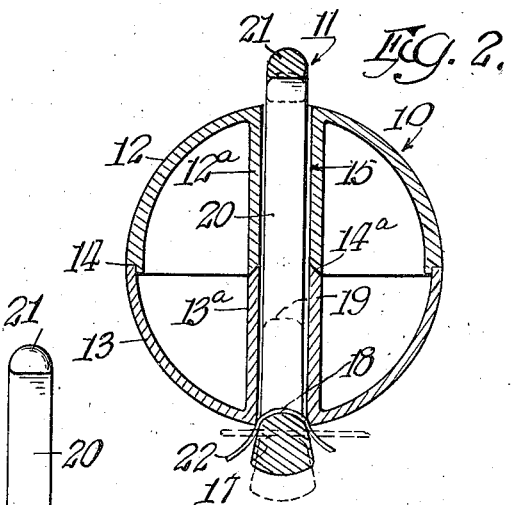
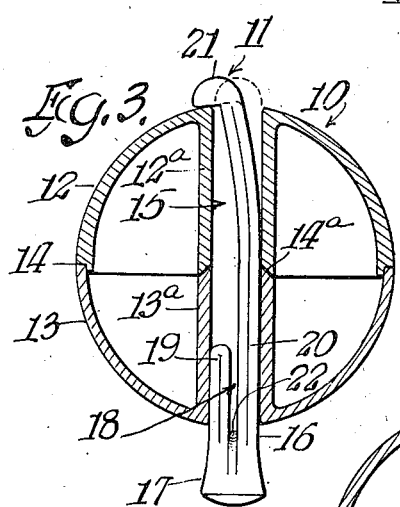
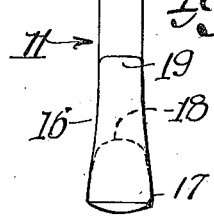
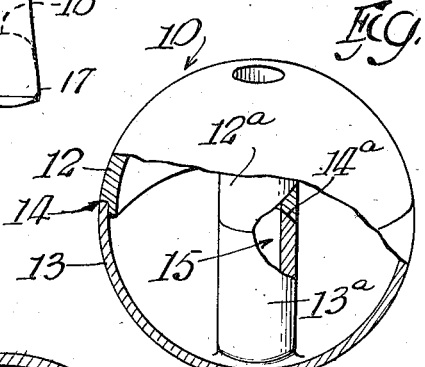
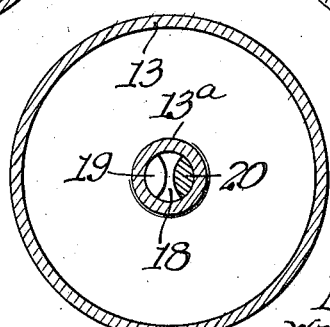
Inventors
Leslie R. Stahnke
William H. Lannert
by Arthur W. Nelson
Atty.

Patented July 6, 1948

2,444,791

UNITED STATES PATENT OFFICE 2,444,791

FISHING LINE FLOAT

Leslie R. Stahnke, Chicago, and William H. Lannert, Skokie, Ill., assignors to Western Engineering and Tool Design, Chicago, Ill., a corporation of Illinois Application April 19, 1946, Serial No. 663,496

6 Claims. (Cl. 43—49)

This invention relates to improvements in fishing line floats and it consists of the matters hereinafter described and more particularly pointed out in the appended claims.

The fishing line float with which the present invention is more especially concerned is of the kind including a float body and a pin that is insertable into one end of a bore through the body and in one position so clamping a fishing line therein as to release the same, without separation from the float body, upon a pull on the line by a fish, to permit a relative movement between said line and the float as a unit.

One of the objects of the present invention is to provide a float of this kind which is of a simple and inexpensive construction and which may be readily assembled, without chance of error, by inserting the pin into the float body from either end of the bore therethrough.

Another object of the invention is to provide a fishing line float of this kind which permits of the lateral entry of a part of the fishing line into the line receiving slit of the pin without requiring the complete removal of the pin from the bore, thereby avoiding a possible loss of the pin when applying the line to the float.

Also, it is an object of the invention to provide a fishing line float of this kind that embodies a pin of such length that when the same is in line clamping position in the float, parts projects beyond each end of the bore therein, so as to be readily engageable by the finger to both push and pull the pin for a more ready withdrawal of the pin from the float body when necessary to do so, or when it is desired to move the pin into a position in the bore, permitting of a new adjustment of the float on the line.

Furthermore, it is an object of the invention to provide a fishing line float wherein it is possible to employ a shoulderless bore in the float body so that the pin may be readily assembled with the body from either end of the bore.

The above mentioned objects of the invention, as well as others, along with the advantages thereof, will more fully appear as the specification proceeds.

In the drawing:

Fig. 1 is a vertical sectional view through the improved float, on a scale somewhat larger than full size, with the parts shown in the relative position wherein a part of the line is releasably clamped to the float in a position ready for use.

Fig. 2 is another vertical sectional view through the improved float, as taken on the line 2—2 of Fig. 1.

Fig. 3 is a view similar to Fig. 1, showing the parts in a changed relation, and wherein the pin has moved to a position, under the action of a pull on the line by a fish, permitting a relative movement between the line and the float, without a complete separation between the float and the pin.

Fig. 4 is a horizontal sectional view through a part of the float, as taken on the line 4—4 of Fig. 1.

Fig. 5 is a perspective view of the float body, with parts broken away for better illustrative purposes, when the same is of a hollow plastic construction.

Fig. 6 is a view in elevation of the line clamping pin of the float when turned through an angle of 90° from that appearing in Figs. 1 and 3.

Referring now in detail to that embodiment of the invention, illustrated in the accompanying drawings, the improved float comprises but two parts, namely a hollow float body 10, which best appears in Fig. 5 and a line clamping pin 11, which best appears in Fig. 6.

The float body is herein shown as of a hollow spherical construction and comprises a pair of hemispherical, upper and lower body parts or shells 12 and 13 respectively, each provided with an axially arranged tubular sleeve 12a and 13a respectively. The peripheral edge of one body part or shell has a cemented rabbeted engagement with the like edge of the other body part, as indicated at 14, and the peripheral edge at one end of the sleeve 12a has a cemented tapered engagement with the like edge of the other sleeve 13a as indicated at 14a in Fig. 5. Preferably said shells are made of a molded plastic material and when they are joined and cemented together, they coact to provide a light weight buoyant water and leak-proof body having a smooth surface bore 15 extending diametrically therethrough, devoid of internal shoulders or the like.

Preferably the pin is also made of a plastic material. It is preferably of a length greater than that of the bore 15 and at one end includes a body part 16 of a diameter to have a fairly snug fit in said bore. Said body part is provided at its extremity with a flaring head 17 of a diameter greater than that of the bore 15 so as to limit the insertion of the pin into said bore. Preferably said head is so formed as to be readily grasped by the fingers of the hand.

The body is formed in a portion thereof with a line receiving slit 18, that terminates short of the head 17 and this slit defines a relatively short shank 19 and a relatively long shank 20. The upper portion of said shank 20 is bowed or curved inwardly toward the plane of the shank 19 and the free end thereof terminates in a lateral projection 21. The distance between the closed end of the slit 18 and the projection 21 is greater than the length of the bore 15. By reason of the bowed upper portion of the shank 20, the same may be flexed laterally by means of thumb pressure into the straight condition appearing in dotted lines in the upper portion of Fig. 3.

With the provision of the long and the short shanks 20 and 19, as described, a part of a fishing line 22 (see Fig. 2) may be readily positioned from the side of the pin for entry into the slit 18, instead of from one end of the pin. Therefore, the line may be applied to the float without a complete withdrawal of the pin from the float body and a loss of the pin therefrom, when the pin is so constructed as to require the entry of the line part into the slit from one end thereof.

When the float reaches the user, it is in an assembled condition. To apply the line 22 thereto for use, the procedure is as follows: Holding the float body in say the left hand, the thumb thereof is engaged with the projection 21 while the fingers of the right hand grasp the head 17. An initial lateral pushing pressure is exerted on the projection 21 and then a longitudinal pushing and a pulling pressure is exerted on the head. This straightens the bowed upper end of the shank 19 as appears in dotted lines in Fig. 3, so that the pin may move longitudinally of the bore to a point wherein the free end of the short shank 19 is exposed beyond the float body. The desired part of the line is then moved laterally toward and into engagement with the associated side of the longer shank 20 and is then shifted down through the slit 18 to engage the bottom thereof. Thus the line may be applied to the float without a complete withdrawal of the pin from the float body.

The pin is thereafter pushed back into the bore so that the line part at either side of the bottom of the slit 18 is clamped between the opposite wall parts of the bore and the side parts of the pin body below the slit as appears in Fig. 2. Thus, this part of the line forms a loop, which is releasably clamped in place and thereby attaches the float body and pin as a unit to the line, and this in a manner preventing the line from slipping relative to the float. At this time, the projection 21 is spaced outwardly from its associated end of the bore and overhangs a part of the body defining said end of the bore, as best appears in Fig. 1.

In use during a fishing operation, the body floats in the water, with the projections 21 uppermost and with the head 17 lowermost, due to the action of the line 22. Should a fish be hooked, it will exert a pull on the line between the float and the fish hook (not shown) and this pull will be first manifested as a jerk. The jerk on the line will cause a downward withdrawal of the pin a distance to engage the projection 21 with that part of the float body previously overhung thereby, as shown in Fig. 3. Thus, while preventing a complete withdrawal of the pin from the line, and which would cause the loss of the float body and probably the pin, the movement of the pin is such as to so dispose the bottom of the groove 18 relative to the associated end of the bore that the line is capable of sliding through the slit, thereby permitting a relative movement between the line and the float which is still a captive of the line. Thus the line may be hauled in by hand or reeled in as it slides through the pin, so that the fish may be brought relatively close to the fisherman for a landing either from a boat or other place.

Thus, while the pin is capable of a limited movement relative to the body, under the action of a jerk on the line, it cannot be lost from the line and the float in no manner interferes with a hauling or reeling in of the line.

After the fish has been removed, the float is slid back along the line to the predetermined position thereon, after which a pressure on the knob end of the pin again, but releasably, locks the line and float operatively together. By reason of the flare of the head 17, if desired, it is possible by means of end pressure thereon, to so wedge the head in its associated end of the bore as to positively lock the line to the float as to prevent the release of the pin, as above mentioned.

Should it be necessary to remove the pin entirely from the float, in the pressing in upon the projection 21, the long shank 20 may be sprung laterally so that the projection 21 may enter its associated end of the bore. A pull on the head withdraws the entire pin from the bore.

To return the pin to position in the float body, that end of the pin bearing the projection 21 is inserted into either end of the bore and this use of either end is possible as there is no internal annular shoulder therein, to be considered. With the projection disposed in said end of the bore, endwise pressure on the head 17 forces the pin through the bore. When the projection 21 passes the other end of the bore, it snaps outwardly to overhang a part of the body defining the said part of the end of the bore.

Preferably the body 10 is made of shells 11 and 12 of contrasting colors better to be seen when floating upon the surface of a body of water.

The float is leakproof and being made of plastic or the like cannot become waterlogged to lose its buoyancy.

Furthermore, the pin, which can be inserted into either end of the bore in the body, cannot become accidentally lost from the body, but may be removed completely therefrom, when necessary, and then replaced therein. As the pin may be inserted into either end of the bore, assembly operation of the parts requires no association of the pin with a particular end of the bore.

As no internal shoulder is necessary in the bore, the same may be more readily made by means of tools and dies which are considerably less expensive than those necessary in producing an internally shouldered bore.

While in describing the invention we have referred in detail to the form, arrangement and construction of the parts involved, the same is to be considered only in the illustrative sense and therefore we do not wish to be limited thereto except as may be specifically set forth in the appended claims.

We claim as our invention:

1. A fishing line float embodying therein a buoyant float body having a bore therethrough and a fishing line attaching pin adapted for insertion into said bore from one end thereof, said pin having a portion at one end formed for a relatively snug fit in said end of said bore, and also having a longitudinal line receiving slit therein which divides the remainder of said pin into a relatively long shank part and a shorter shank part permitting a lateral entry of a part of a fishing line into said slit, the free end of said long shank part normally extending beyond the other end of said bore and carrying a lateral projection which is spaced outwardly from and overhangs a part of the body defining said other end of the bore when said pin is in a position in said bore with a portion of said fishing line part clamped between the first mentioned end of said pin and the associated end of the bore.

2. A fishing line float embodying therein a buoyant float body having a bore therethrough and a fishing line attaching pin adapted for insertion into said bore from one end thereof, said pin having a portion at one end formed for a relatively snug fit in said end of said bore, said pin having means at the extremity of said end that limits its insertion into said end of the bore, said end of said pin having a longitudinal line receiving slit therein which divides the remainder of said pin into a relatively long shank part and a shorter shank part permitting a lateral entry of a part of a fishing line into said slit, the free end of said long shank part normally extending beyond the other end of said bore and carrying a lateral projection which is spaced outwardly from and overhangs a part of the body defining said other end of the bore when said pin is in a position in said bore with a portion of said fishing line part clamped between the first mentioned end of the pin and the associated end of the bore.

3. A fishing line float embodying therein a buoyant float body having a bore therethrough and a fishing line attaching pin adapted for insertion into said bore from one end thereof, said pin having a portion at one end formed for a relatively snug fit in said end of said bore, and also having a longitudinal line receiving slit therein which divides the remainder of said pin into a relatively long shank part and a shorter shank part permitting a lateral entry of a part of a fishing line into said slit, the free end of said long shank part normally extending beyond the other end of said bore and being formed for a lateral flexure and carrying at its extremity a lateral projection, said extremity and said projection having a width approximating the diameter of said bore, said projection being spaced outwardly from and overhanging a part of the body defining said other end of said bore when said pin is in a position in said bore with a portion of said fishing line part clamped between said first mentioned end of said pin and the associated end of the bore.

4. A fishing line float embodying therein a buoyant float body having a bore therethrough of the same diameter end to end and a fishing line attaching pin adapted for insertion into said bore from either end thereof, said pin having a portion at one end thereof formed for a relatively snug fit in that end of the bore into which it is inserted, and also having a longitudinal line receiving slit therein, which divides the remainder of said pin into a relatively long shank part and a shorter shank part permitting a lateral entry of a part of a fishing line into said slit, the free end of said long shank part normally extending beyond the other end of said bore and carrying a lateral projection which is normally spaced outwardly from and overhangs a part of the body defining the other end of the bore when said pin is in a position in said bore with a portion of said fishing line part releasably clamped between the first mentioned end of said pin and the associated end of the bore.

5. A fishing line float embodying therein a buoyant float body having a bore therethrough and a fishing line attaching pin of a length greater than and adapted for insertion into said bore from one end thereof and having a portion at one end formed for a relatively snug fit in said end of said bore, said pin having a longitudinal line receiving slit therein which divides the remainder of said pin into shank parts, the free end of at least one of said shank parts being formed for a lateral flexure and carrying at its extremity a lateral projection, said projection being normally spaced outwardly from and overhanging a part of the body defining the other end of said bore when said pin is in a position in said bore with a portion of said fishing line part releasably clamped between said first mentioned end of said pin and the associated end of the bore.

6. In a fishing line float, a pin for attaching a part of the line to the float and embodying therein a pin body having a portion of enlarged diameter adapted to be grasped by the fingers, there being a longitudinal line receiving slit in said body inwardly of said portion of enlarged diameter and which slit divides the remainder of said body into a relatively long shank and a relatively shorter shank, the free end portion of said long shank being formed for a lateral flexure and terminating in a lateral projection that overhangs the plane of the shorter shank.

LESLIE R. STAHNKE.
WILLIAM H. LANNERT.

REFERENCES CITED

The following references are of record in the file of this patent:

UNITED STATES PATENTS

| Number | Name | Date |
| --- | --- | --- |
| 1,850,748 | Foster | Mar. 22, 1932 |
| 2,379,676 | Blackstone | July 3, 1945 |
| 2,415,692 | Huston | Feb. 11, 1947 |